US011629811B2

(12) United States Patent
Huang et al.

(10) Patent No.: US 11,629,811 B2
(45) Date of Patent: Apr. 18, 2023

(54) DISPLAY SUPPORTING DEVICE

(71) Applicant: SYNCMOLD ENTERPRISE CORP., New Taipei (TW)

(72) Inventors: Chun-Hao Huang, New Taipei (TW); Chien-Wei Cheng, New Taipei (TW); Chien-Cheng Yeh, New Taipei (TW)

(73) Assignee: SYNCMOLD ENTERPRISE CORP., New Taipei (TW)

(*) Notice: Subject to any disclaimer, the term of this patent is extended or adjusted under 35 U.S.C. 154(b) by 0 days.

(21) Appl. No.: 17/648,818

(22) Filed: Jan. 25, 2022

(65) Prior Publication Data
US 2022/0252208 A1    Aug. 11, 2022

Related U.S. Application Data

(60) Provisional application No. 63/146,832, filed on Feb. 8, 2021.

(30) Foreign Application Priority Data

Dec. 8, 2021  (TW) .................................. 110214620

(51) Int. Cl.
*F16M 11/10*  (2006.01)
*F16M 11/04*  (2006.01)

(52) U.S. Cl.
CPC ........... *F16M 11/10* (2013.01); *F16M 11/041* (2013.01)

(58) Field of Classification Search
CPC ...... F16M 11/04; F16M 11/041; F16M 11/10; F16M 11/125; F16M 11/06; G09F 9/35
See application file for complete search history.

(56) References Cited

U.S. PATENT DOCUMENTS

| 7,389,963 | B2* | 6/2008 | Cho | F16M 11/28 248/917 |
| 7,984,881 | B2* | 7/2011 | Liu | F16M 11/16 361/679.01 |
| 8,087,624 | B2* | 1/2012 | Varney | F16M 11/10 248/917 |
| 9,791,095 | B2* | 10/2017 | Chen | F16M 11/10 |
| 10,309,578 | B2* | 6/2019 | Yen | F16M 11/041 |
| 10,638,620 | B2* | 4/2020 | Huang | F16M 11/10 |

(Continued)

FOREIGN PATENT DOCUMENTS

CN            212617111 U         2/2021

*Primary Examiner* — Eret C McNichols
(74) *Attorney, Agent, or Firm* — Osha Bergman Watanabe & Burton LLP

(57) ABSTRACT

A display supporting device is provided and includes: a protruding neck; a quick-release unit having a quick-release base and a fixing member, where the quick-release base is detachably disposed on the protruding neck by the fixing member; a carrying unit having a bearing base, where the bearing base is connected to the quick-release base, and is able to rotate between a first position and a second position relative to the quick-release base with a main axis; and a first torsion spring unit constantly providing a first elastic force and disposed along a first axis that is substantially parallel to the main axis. The display supporting device can effectively reduce the overall thickness of the carrying unit and meet the torsion requirement of a large-sized display by deviating an arrangement position of the first torsion spring unit from the main axis.

19 Claims, 9 Drawing Sheets

(56) References Cited

U.S. PATENT DOCUMENTS

| | | | | |
|---|---|---|---|---|
| 10,794,530 B2* | 10/2020 | Yeh | .................. | F16M 11/08 |
| 11,067,215 B2* | 7/2021 | Lee | .................. | F16M 11/105 |
| 11,156,323 B2* | 10/2021 | Kang | .................. | F16M 13/02 |
| 11,320,088 B1* | 5/2022 | Ding | .................. | F16M 11/18 |
| 11,333,295 B2* | 5/2022 | Huang | .................. | F16M 11/16 |
| 11,359,760 B2* | 6/2022 | Huang | .................. | F16F 1/26 |
| 11,543,069 B2* | 1/2023 | Huang | .................. | F16M 11/10 |
| 2006/0038092 A1* | 2/2006 | Choi | .................. | F16M 11/105 |
| | | | | 248/917 |
| 2007/0120032 A1* | 5/2007 | Anderson | .......... | F16M 11/2014 |
| | | | | 248/282.1 |
| 2011/0062304 A1* | 3/2011 | Hsieh | .................. | F16M 13/00 |
| | | | | 248/372.1 |
| 2022/0228697 A1* | 7/2022 | Huang | .................. | F16M 11/2021 |

* cited by examiner

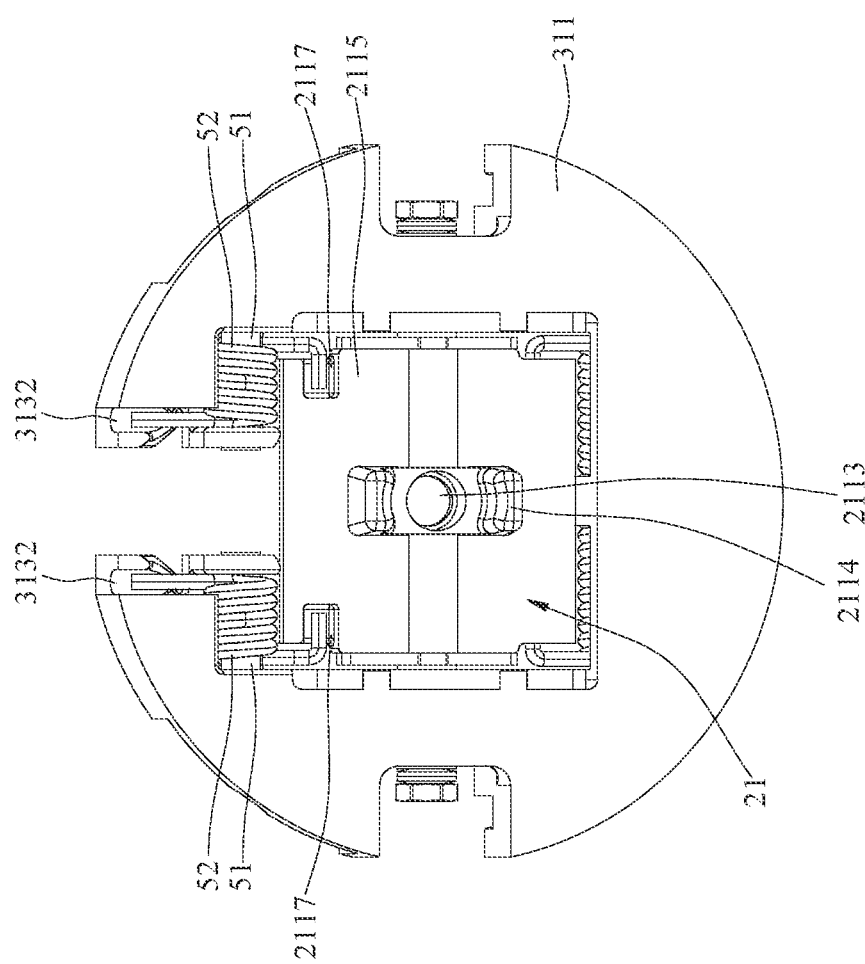

DISPLAY SUPPORTING DEVICE

CROSS-REFERENCE TO RELATED APPLICATION

This application claims the benefit of U.S. Provisional Application Ser. No. 63/146,832 filed on Feb. 8, 2021, and the benefit of Taiwan Patent Application Serial No. 110214620 filed on Dec. 8, 2021. The entirety of each application is incorporated herein by reference.

BACKGROUND

1. Technical Field

The present disclosure relates to a display supporting device, and more particularly, to a display supporting device that can meet torque requirements of large-sized displays while maintaining a light and thin overall thickness.

2. Description of Related Art

The China Patent No. CN212617111U discloses an internal-sinking type double-rotation mechanism comprising a fixing component and a pivot component, wherein a circular cavity is provided in the middle of one side of the fixing component. The pivot component comprises a movable plate and a pivot block, wherein the pivot block is installed on the movable plate and is pivotally connected to the movable plate, the movable plate is sunk in the circular cavity, an outer diameter of the movable plate is smaller than a diameter of the circular cavity, and the pivot block protrudes outward to be exposed outside the circular cavity. The mechanism combines functions of rotation and tilting forward and backward, such that a thickness of the fixing component can be thinned, which is in line with the trend of lightness and thinness in recent years.

However, due to the thinning of the thickness of the fixing component, the size of a first torsion spring and a second torsion spring cannot be too large, and the torque that can be provided is limited, which cannot meet the needs of large-sized displays (heavier weight). Therefore, there is still room for improvement.

SUMMARY

The present disclosure provides a display supporting device for carrying a display on a work surface, the display supporting device comprises: a supporting upright disposed on the work surface and including a protruding neck; a quick-release unit having a quick-release base and a fixing member, wherein the quick-release base is detachably arranged on the protruding neck by the fixing member; a carrying unit provided for the display and having a bearing base, wherein the bearing base is connected to the quick-release base, and is able to pivotally change between a first position and a second position relative to the quick-release base with a main axis as a center; and a first torsion spring unit constantly providing a first elastic force and having a first spindle rod and at least one first torsion spring, wherein the first spindle rod extends along a first axis being substantially parallel to the main axis, and wherein the at least one first torsion spring is sleeved on the first spindle rod and abuts against the bearing base and the quick-release base respectively, wherein when an external force is applied, the display and the carrying unit are able to rotate relative to the quick-release base between the first position and the second position, and wherein when the external force is removed, the display and the carrying unit are able to be stopped at an arbitrary position between the first position and the second position relative to the quick-release base.

In the aforementioned display supporting device, the bearing base has a main penetrating groove and at least one first accommodating groove, wherein the quick-release base is accommodated in the main penetrating groove, and the at least one first torsion spring is correspondingly accommodated in the at least one first accommodating groove.

In the aforementioned display supporting device, the first elastic force is smallest when the bearing base is in the first position, wherein the first elastic force is largest when the bearing base is in the second position.

In the aforementioned display supporting device, the display supporting device further comprises a second torsion spring unit constantly providing a second elastic force and having a second spindle rod and at least one second torsion spring, wherein the second spindle rod extends along a second axis being substantially parallel to the main axis, and wherein the at least one second torsion spring is sleeved on the second spindle rod and abuts against the bearing base and the quick-release base respectively.

In the aforementioned display supporting device, the bearing base further has at least one second accommodating groove, wherein the at least one second torsion spring is correspondingly accommodated in the at least one second accommodating groove.

In the aforementioned display supporting device, the second elastic force is smallest when the bearing base is in the first position, wherein the second elastic force is largest when the bearing base is in the second position.

In the aforementioned display supporting device, the bearing base has a disc-shaped plate, a first base body and a second base body, wherein the main penetrating groove is formed on a center of the disc-shaped plate, and the first base body and the second base body are formed at intervals on the disc-shaped plate and respectively adjacent to the main penetrating groove, and wherein the at least one first accommodating groove is formed on the first base body, and the at least one second accommodating groove is formed on the second base body.

In the aforementioned display supporting device, the at least one first torsion spring and the at least one second torsion spring are in quantity of two respectively, and the at least one first accommodating groove and the at least one second accommodating groove are in quantity of two respectively.

In the aforementioned display supporting device, the first base body further has a stop block, two first slideways and two first abutting portions, wherein the first slideways extend in an arc shape along the first axis, and the first slideways are located on two sides of the stop block respectively, and wherein each of the first abutting portions is respectively formed between the stop block and the first slideways, intercommunicates with the first accommodating grooves, and allows one end of each of the first torsion springs to abut.

In the aforementioned display supporting device, the second base body further has two second slideways and two second abutting portions, wherein the second slideways extend in an arc shape along the second axis, and each of the second abutting portions allows one end of each of the second torsion springs to abut.

In the aforementioned display supporting device, the quick-release base has a body and two main spindle rods extending from two sides of the body, wherein the bearing base further has two mounting plates spaced apart from each other and adjacent to the main penetrating groove, and wherein the main spindle rods respectively and correspondingly penetrate through the mounting plates.

In the aforementioned display supporting device, the two sides of the body respectively have a recess, the quick-release base further has two sealing plates, wherein each of the sealing plates covers each of the recesses, and each of the main spindle rods correspondingly penetrates through each of the sealing plates and is partially and correspondingly accommodated in each of the recesses.

In the aforementioned display supporting device, the quick-release unit further has two friction members, and the friction members are respectively and correspondingly sleeved on the main spindle rods.

In the aforementioned display supporting device, the carrying unit further has a clamping plate member and a carrying plate member, wherein the carrying plate member is sandwiched between the clamping plate member and the bearing base, and is able to pivot relative to the bearing base with a pivot axis as a center.

In the aforementioned display supporting device, each of the sealing plates has a penetrating hole, and each of the mounting plates has a passing hole, wherein each of the main spindle rods correspondingly penetrates through the penetrating holes and the passing holes respectively, and a cross-sectional shape of each of the main spindle rods matches with a cross-sectional shape of each of the penetrating holes and is non-circular, and a cross-sectional shape of each of the passing holes is circular.

In the aforementioned display supporting device, the carrying plate member has a carrying plate and an annular plate, and the clamping plate member has a clamping plate and a washer, wherein the carrying plate is used for carrying the display, wherein the annular plate engages with the carrying plate, is sandwiched between the carrying plate and the bearing base, and has two positioning blocks, and wherein the positioning blocks are able to slide in the first slideways and the second slideways and are stopped by the stop block, the clamping plate is fixed to the bearing base, and the washer is sandwiched between the clamping plate and the carrying plate.

In the aforementioned display supporting device, each of the friction members has a first friction fin set and a second friction fin set, wherein each of the first friction fin sets has a plurality of first friction fins and a through hole, wherein each of the through holes penetrates through the first friction fins and is provided for each of the main spindle rods to penetrate through, wherein each of the second friction fin sets has a plurality of second friction fins and a circular hole, wherein each of the circular holes penetrates through the second friction fins and is provided for each of the main spindle rods to penetrate through, and wherein the first friction fins and the second friction fins are alternately stacked with each other, and a cross-sectional shape of each of the through holes matches with the cross-sectional shape of each of the main spindle rods and is non-circular.

In the aforementioned display supporting device, each of the second friction fin sets further has a fixing block, each of the mounting plates further has a fixing hole, and the fixing block is formed on one of the second friction fins closest to the mounting plates and engages with the fixing hole, wherein when the carrying unit rotates relative to the quick-release base, each of the second friction fin sets is able to generate relative rotation and friction with each of the first friction fin sets.

In the aforementioned display supporting device, the protruding neck has an adjoining surface, the body has an abutting surface, and the adjoining surface and the abutting surface are matched and are respectively a concave arc surface and a convex arc surface, wherein when the quick-release base is disposed on the protruding neck, the adjoining surface is attached to the abutting surface.

BRIEF DESCRIPTION OF THE DRAWINGS

FIG. 4B is a rear view of some elements of the display supporting device according to the present disclosure.

DETAILED DESCRIPTIONS

Figure 1:
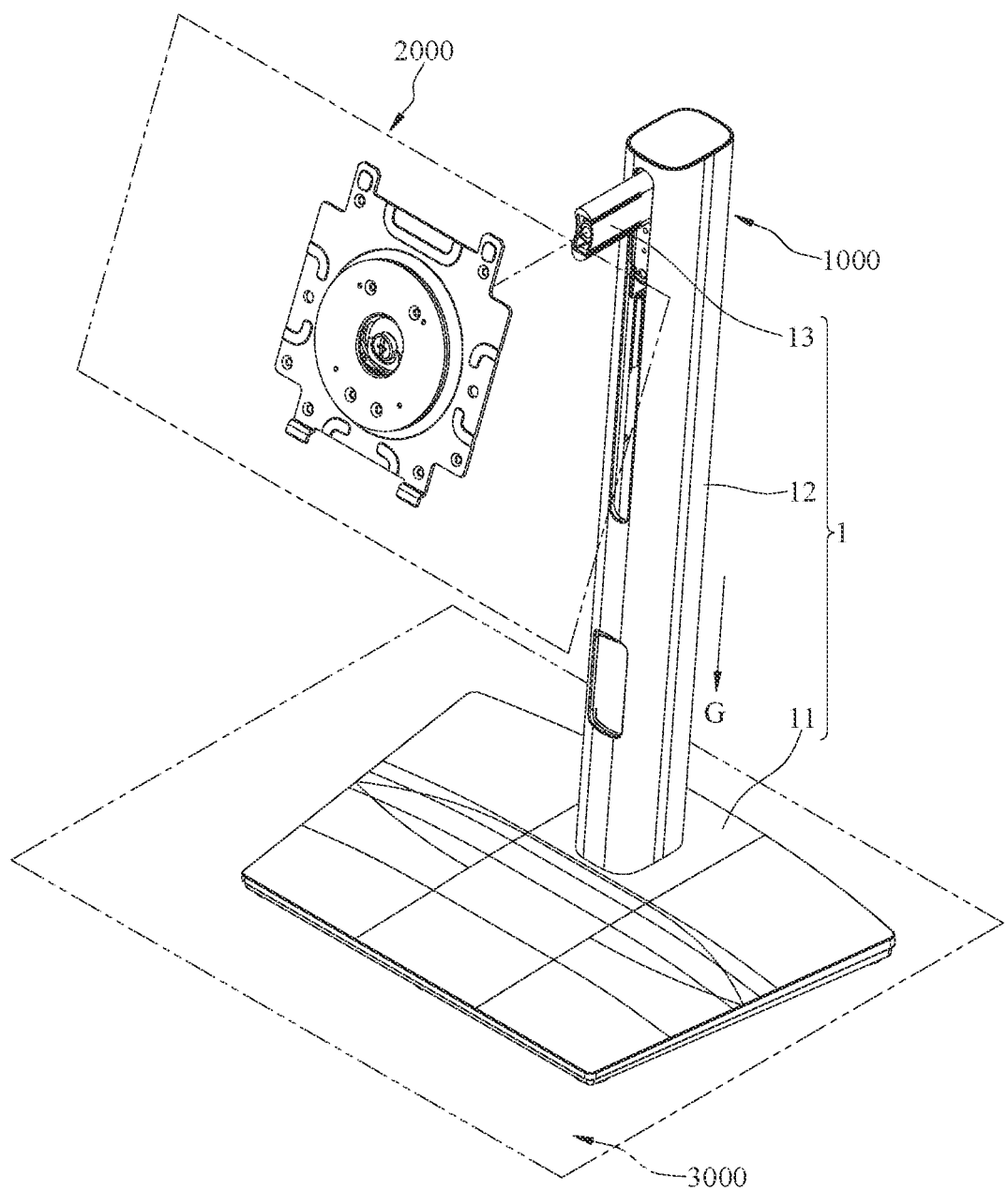
FIG. 1 is a schematic view of a display supporting device according to the present disclosure.
Figure 2:
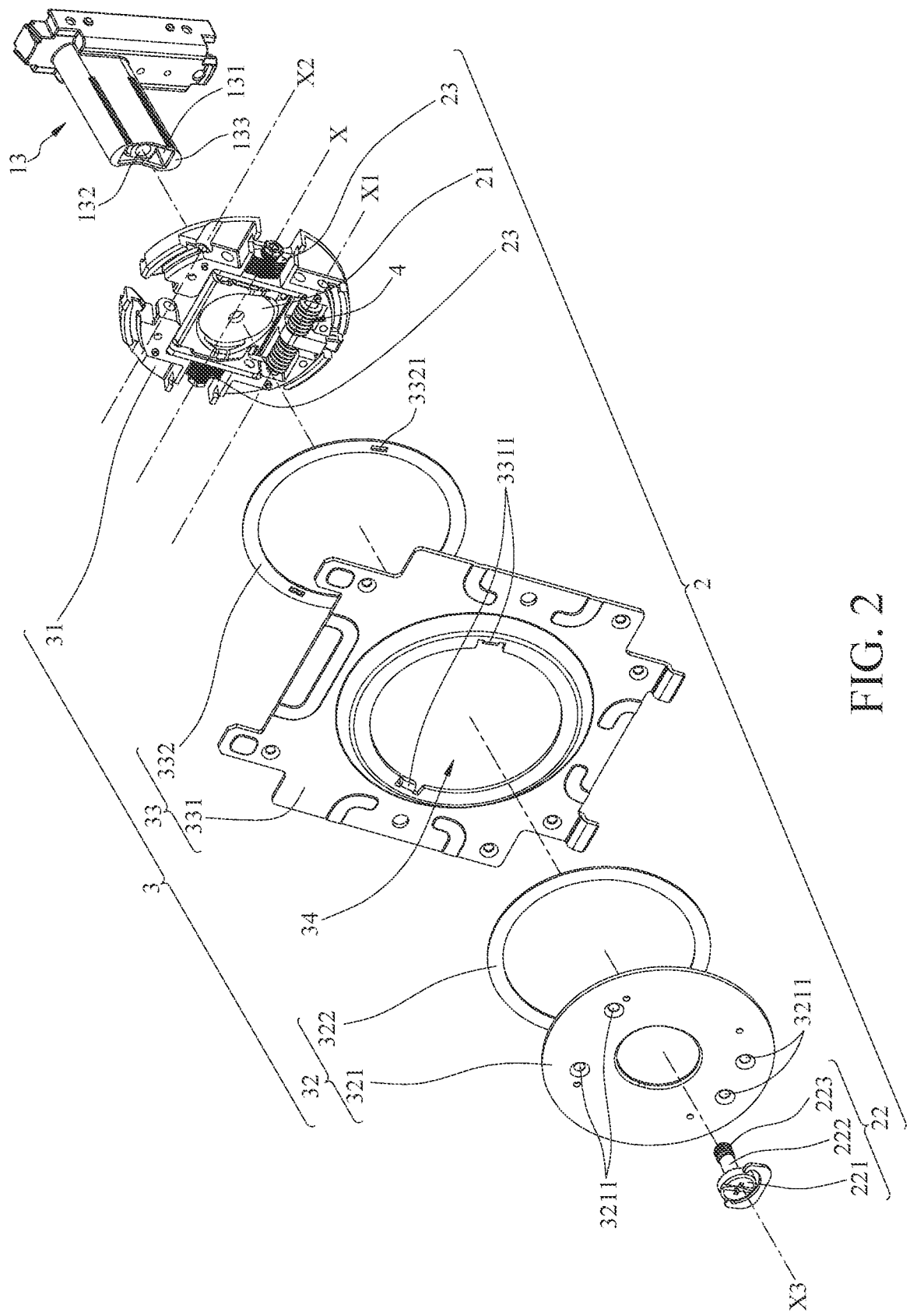
FIGS. 2 and 3 are schematic exploded views of different viewing angles of some elements of the display supporting device according to the present disclosure.
Figure 3:
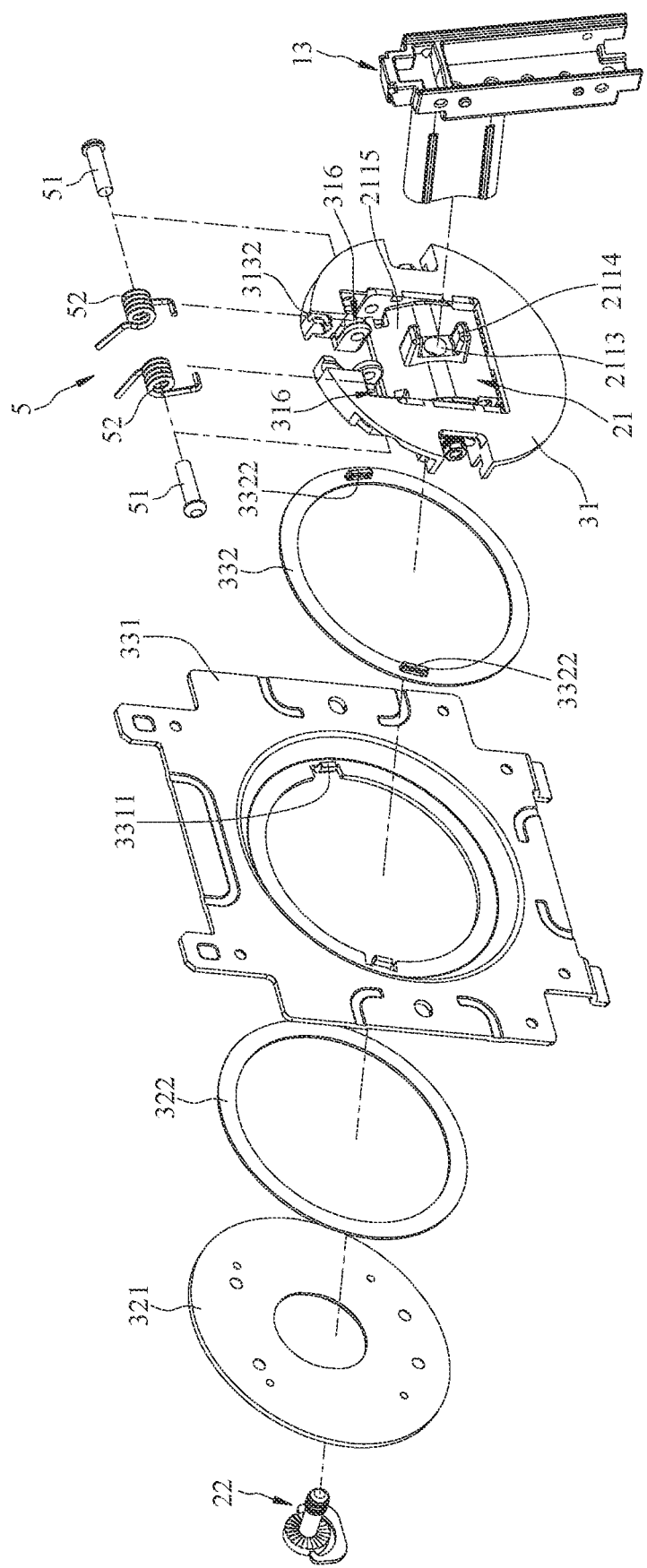

Please refer to FIGS. 1 to 3, a display supporting device 1000 according to the present disclosure is used for carrying a display 2000 on a work surface 3000 (such as a desktop, a wall, etc.), and the display supporting device 1000 includes a supporting upright 1, a quick-release unit 2, a carrying unit 3, a first torsion spring unit 4 and a second torsion spring unit 5. The supporting upright 1 is disposed on the work surface 3000, for example, it is placed upright on a desktop. The quick-release unit 2 is detachably arranged on the supporting upright 1. The carrying unit 3 is connected to the quick-release unit 2, is able to pivot relative to the supporting upright 1, and is provided for the display 2000 to be disposed. The first torsion spring unit 4 is arranged on the carrying unit 3, abuts against the quick-release unit 2 and the carrying unit 3, and constantly provides a first elastic force. The second torsion spring unit 5 is arranged on the carrying unit 3, abuts against the quick-release unit 2 and the carrying unit 3, and constantly provides a second elastic force. Part of the drawings shows a gravity direction G, a main axis X, a first axis X1, a second axis X2, a third axis X3, and a pivot axis Y, wherein the main axis X is perpendicular to the gravity direction G, the first axis X1 and the second axis X2 are parallel to the main axis X and spaced apart from each other, the pivot axis Y is perpendicular to the main axis X, and the third axis X3 is perpendicular to the gravity direction G and the main axis X.

Figure 6A:
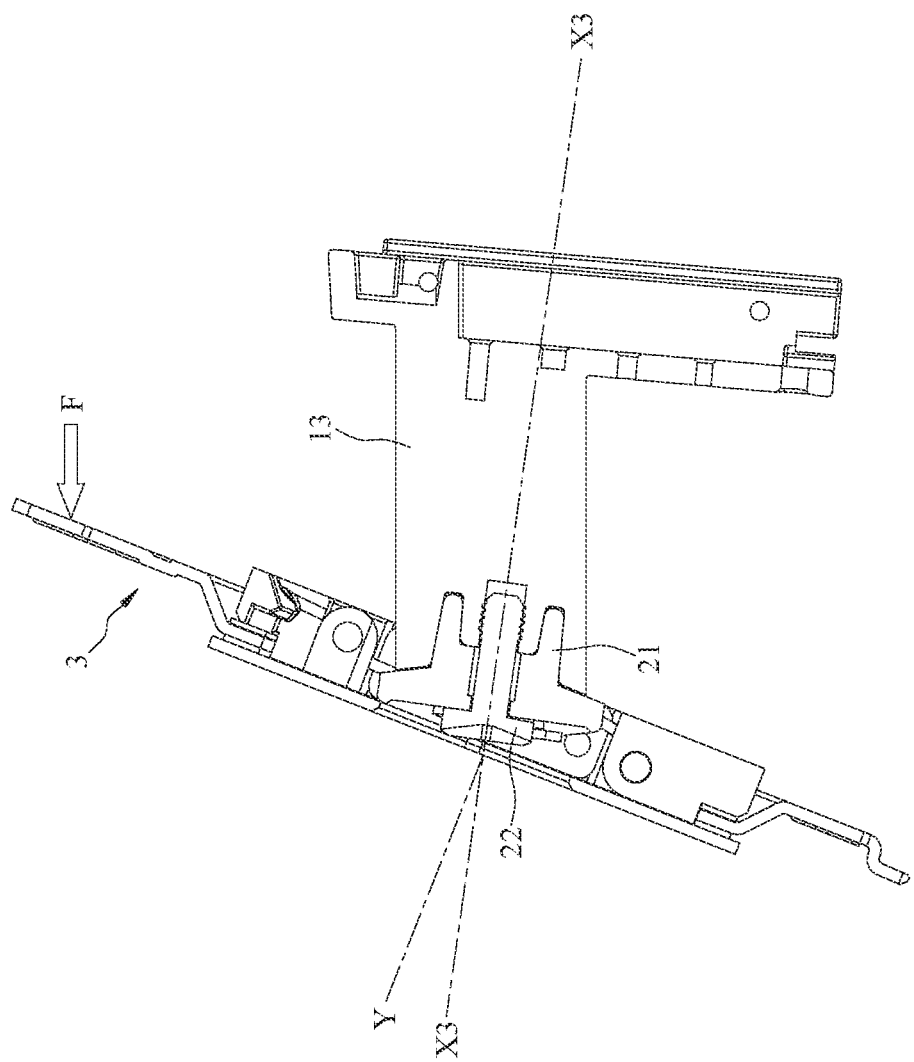
FIG. 6A is a schematic view of the display supporting device according to the present disclosure in a first position.
Figure 6B:
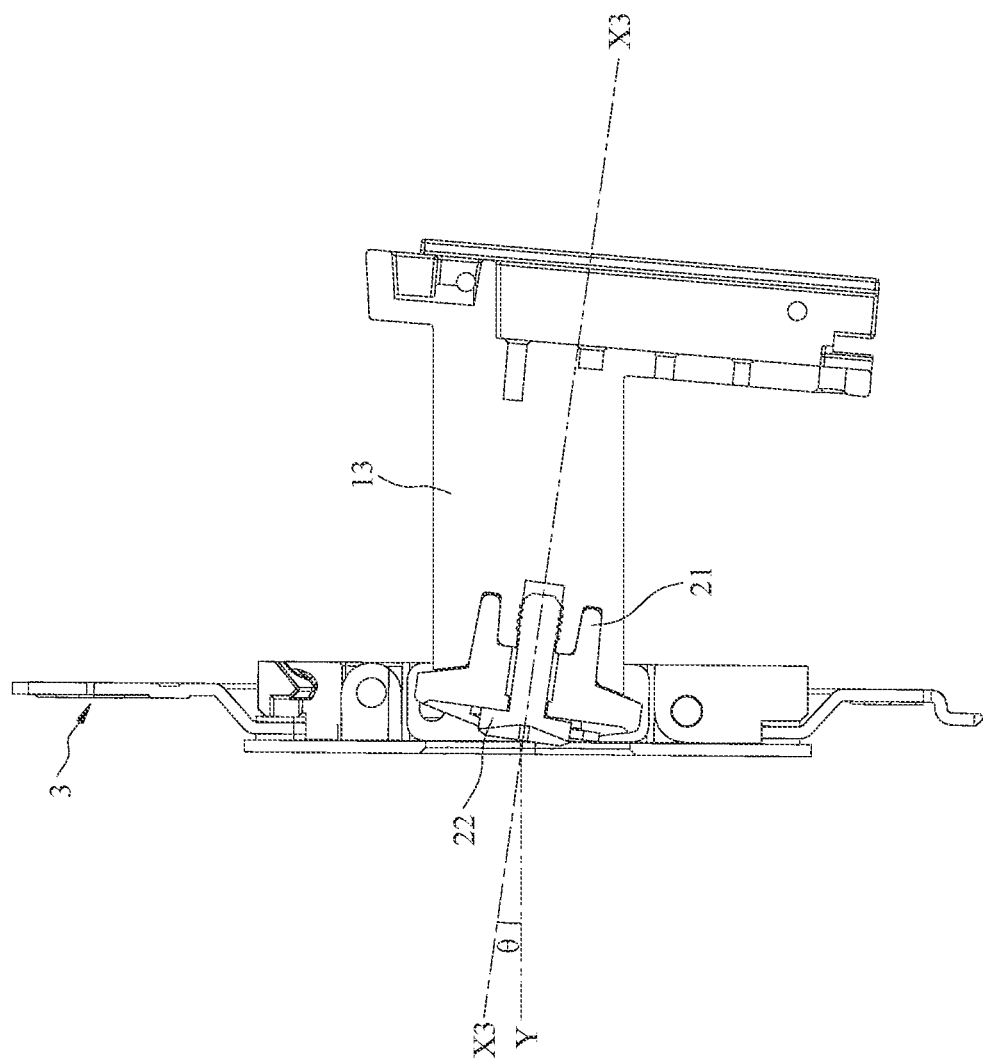
FIG. 6B is a schematic view of the display supporting device according to the present disclosure in a second position.

The supporting upright 1 includes a base 11, a column 12 and a protruding neck 13. The base 11 is roughly a trapezoidal plate body and disposed on the work surface 3000, but it is not limited to this. The base 11 may also be in a form of clamping a table or fixing on a wall. The column 12 is roughly a rectangular column, which extends substantially along the gravity direction G, and is disposed on the base 11. The protruding neck 13 extends outward non-parallelly relative to the gravity direction G, is disposed on the column 12, and has an engaging groove 131, a screw locking hole 132 and an adjoining surface 133. The protruding neck 13 according to the present disclosure is a fixed type as an example, but it can also be a sliding type (for example, a slider that can slide back and forth substantially parallel to the gravity direction G). The adjoining surface 133 has a first area and a second area (reference numerals are not shown in the figures) that are spaced apart from each other. The engaging groove 131 and the screw locking hole 132 are located between the first area and the second area, and the first area and the second area jointly and equivalently define a concave arc surface (as shown in FIGS. 6A and 6B).

The quick-release unit 2 includes a quick-release base 21, a fixing member 22 and two friction members 23. The quick-release base 21 is detachably disposed on the protruding neck 13 along the third axis X3. The fixing member 22 can penetrate through the quick-release base 21 along the third axis X3 and be screwed to the screw locking hole 132 to fix the quick-release base 21 to the protruding neck 13. Each of the friction members 23 is respectively and correspondingly arranged on both sides of the quick-release base 21.

Figure 4A:
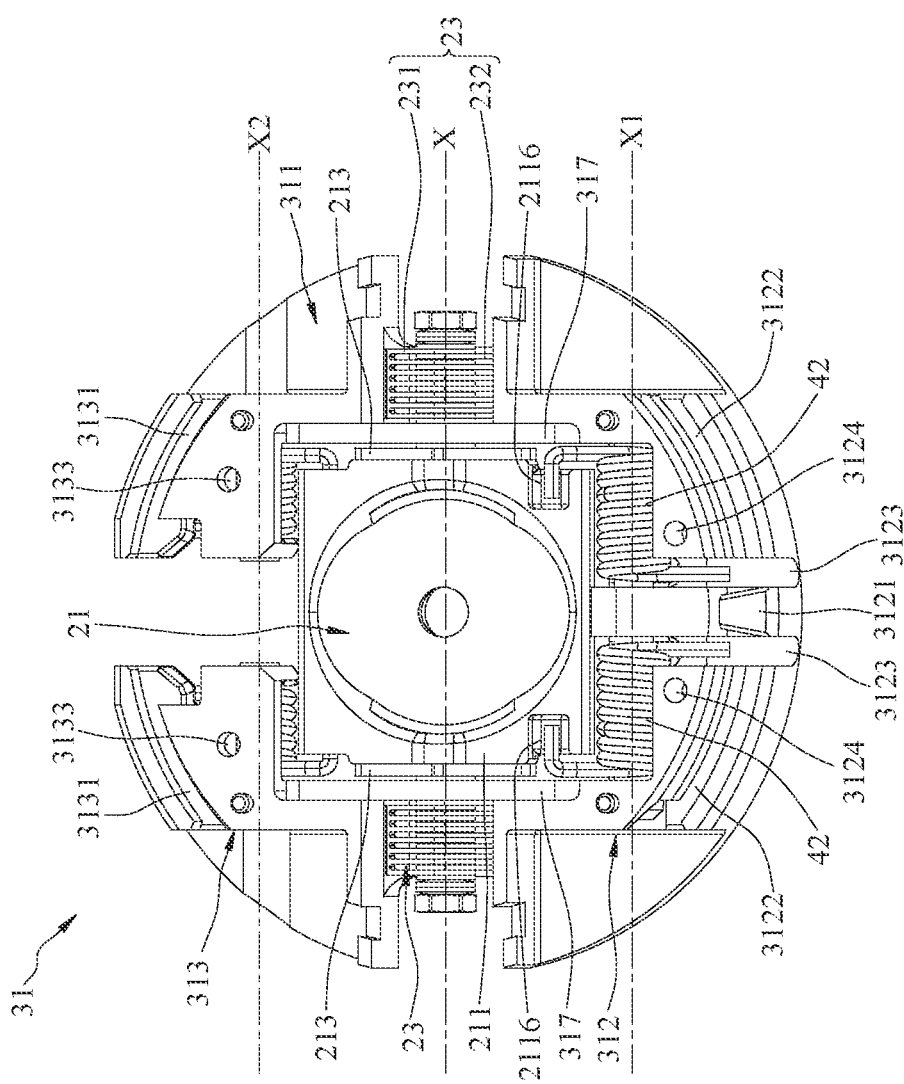
FIG. 4A is a front view of some elements of the display supporting device according to the present disclosure.
Figure 5A:
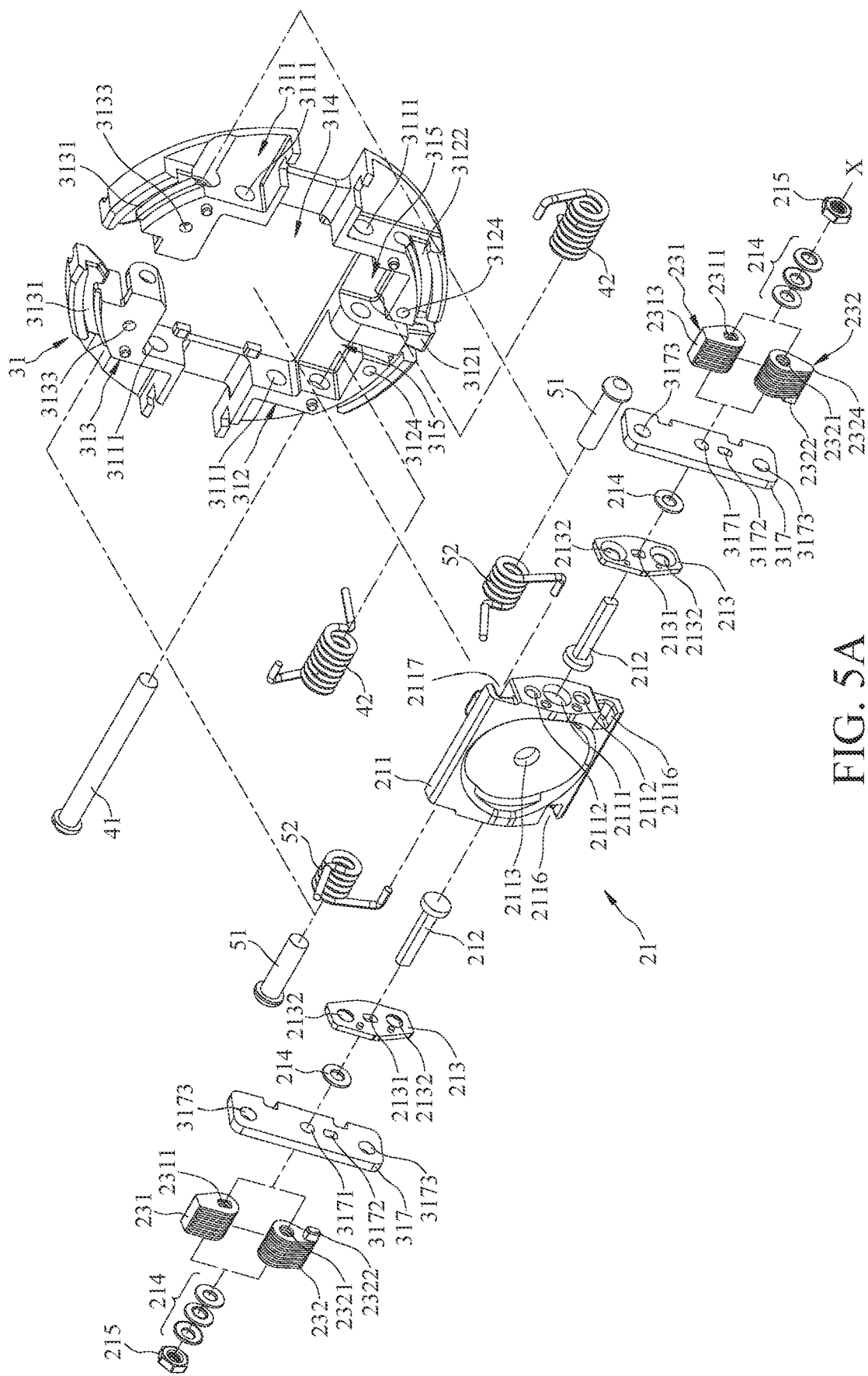
FIG. 5A is a schematic detailed exploded view of some elements of the display supporting device according to the present disclosure.

Please refer to FIG. 4A, FIG. 4B and FIG. 5A together. The quick-release base 21 has a body 211, two main spindle rods 212, two sealing plates 213, eight gaskets 214, and two nuts 215. The body 211 has a recess 2111 and two locking holes 2112 on opposite sides, a body hole 2113 penetrating through a front side and a rear side at the center, two first adjoining portions 2116 on the front side, and an engaging base 2114, an abutting surface 2115 and two second adjoining portions 2117 on the rear side. Each of the recesses 2111 is located between the corresponding locking holes 2112, and the locking holes 2112 are respectively adjacent to the first adjoining portions 2116 and the second adjoining portions 2117. The engaging base 2114 is roughly a U-shaped protrusion to be accommodated in the engaging groove 131. The abutting surface 2115 matches with the adjoining surface 133 and is a convex arc surface that is not parallel to the column 12 (as shown in FIG. 6A and FIG. 6B). When the quick-release base 21 is disposed on the protruding neck 13, the abutting surface 2115 attaches to the adjoining surface 133. The first adjoining portions 2116 and the second adjoining portions 2117 are arranged up and down along the gravity direction G and are spaced apart relative to the recesses 2111 and the locking holes 2112. In the embodiment, each of the first adjoining portions 2116 and each of the second adjoining portions 2117 are respectively a groove, wherein the first adjoining portions 2116 are substantially exposed on the front side, and the second adjoining portions 2117 are substantially exposed on the rear side. A cross-sectional shape of each of the main spindle rods 212 is a flat shape, but is not limited to this. Each of the main spindle rods 212 is partially and correspondingly accommodated in the recess 2111 along the main axis X. Each of the sealing plates 213 is roughly a hexagonal plate, correspondingly covers the recess 2111, and has a penetrating hole 2131 and two screw holes 2132. The penetrating hole 2131 is for each of the main spindle rods 212 to penetrate through. A cross-sectional shape of the penetrating hole 2131 is a flat shape, but it is not limited to this, and matches with the cross-sectional shape of each of the main spindle rods 212. The screw holes 2132 intercommunicate with the locking holes 2112, and screws (not shown) can be used to penetrate through the screw holes 2132 to be screwed into the locking holes 2112, thereby locking the sealing plates 213 to the body 211. The gaskets 214 are sleeved on the main spindle rods 212. The nuts 215 are screwed to the main spindle rods 212.

The fixing member 22 has a head 221, a shaft 222, and a thread 223. The head 221 is fixed to one end of the shaft 222, and the thread 223 is formed on the other end of the shaft 222. The fixing member 22 penetrates through the body hole 2113 with the shaft 222 along the third axis X3 and is screwed into the screw locking hole 132 with the thread 223, and the head 221 abuts against the body 211, whereby the quick-release base 21 is fixed to the protruding neck 13. In the embodiment, the fixing member 22 is a quick-release screw.

Figure 5B:
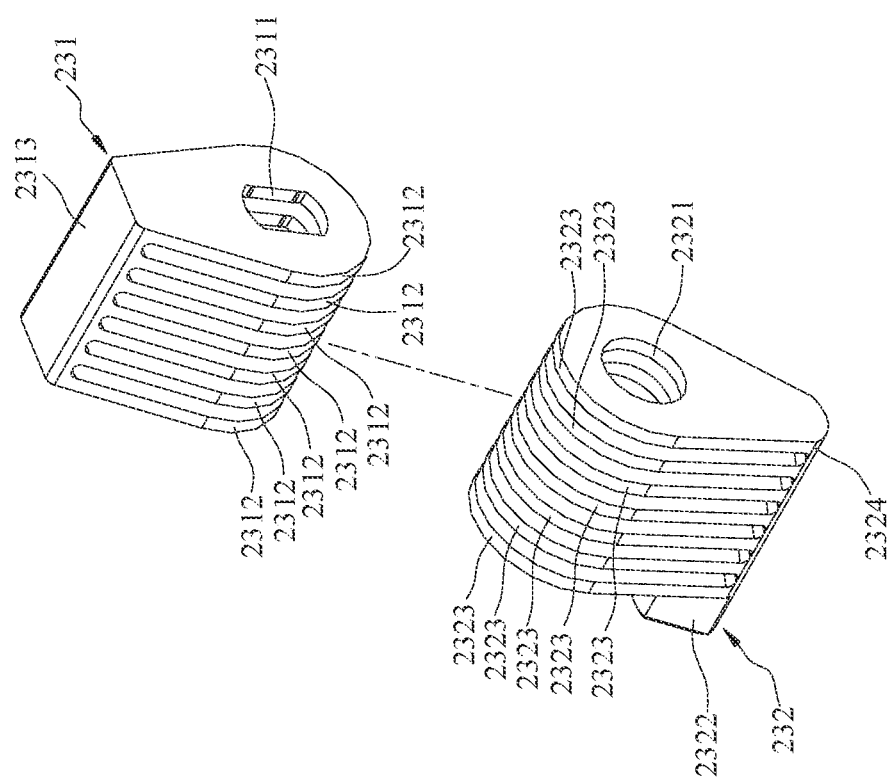
FIG. 5B is a schematic enlarged view of a first friction fin set in FIG. 5A.

The friction members 23 are respectively and correspondingly sleeved on the main spindle rods 212. Each of the friction members 23 has a first friction fin set 231 and a second friction fin set 232. Referring to FIG. 5B, in the embodiment, each of the first friction fin sets 231 has a through hole 2311, seven first friction fins 2312, and a first bottom plate 2313, wherein the through hole 2311 penetrates through the first friction fins 2312, a cross-sectional shape of the through hole 2311 matches with the cross-sectional shape of each of the main spindle rods 212 and is a flat shape, but it is not limited to this, as long as it is non-circular. Each of the through holes 2311 is provided for each of the main spindle rods 212 to penetrate through, such that the first friction fins 2312 can move simultaneously with each of the main spindle rods 212. The first friction fins 2312 are fixed on the first bottom plate 2313 at intervals, and are respectively a drop-shaped friction sheet. In the embodiment, the first friction fins 2312 and the first bottom plate 2313 are integrally formed. Each of the second friction fin sets 232 has a circular hole 2321, a fixing block 2322, seven second friction fins 2323, and a second bottom plate 2324. The second friction fins 2323 are respectively a drop-shaped friction sheet, are alternately stacked with the first friction fins 2312, and are fixed to the second bottom plate 2324 at intervals. In the embodiment, the second friction fins 2323 and the second bottom plate 2324 are integrally formed. Each of the circular holes 2321 correspondingly penetrates through the second friction fins 2323, and a cross-sectional shape of the circular hole 2321 is larger than the cross-sectional shape of each of the main spindle rods 212. Each of the circular holes 2321 is provided for each of the main spindle rods 212 to penetrates through, such that each of the second friction fin sets 232 is able to rotate relative to each of the main spindle rods 212 and generates relative rotation and friction with each of the first friction fin sets 231, wherein each of the fixing blocks 2322 is a flat-shaped protrusion. In addition to the integrated fin design of the first friction fin sets 231 and the second friction fin sets 232 described above, in other embodiments, the friction members 23 according to the present disclosure may also be designed such that a plurality of circular friction sheets are alternately stacked on each other (that is, the first bottom plate 2313 and the second bottom plate 2324 are omitted), but the present disclosure is not limited to this. In addition, three of the gaskets 214 are arranged between each of the friction members 23 and each of the nuts 215.

The carrying unit 3 includes a bearing base 31, a clamping plate member 32, a carrying plate member 33, and an accommodating space 34. The bearing base 31 is roughly a hollow disc base, is connected to the quick-release base 21, and can pivotally change between a first position and a second position relative to the quick-release base 21 with the main axis X as the center. The clamping plate member 32 is fixed to the bearing base 31 and can move simultaneously with the bearing base 31. The carrying plate member 33 is sandwiched between the bearing base 31 and the clamping plate member 32, and can pivot relative to the bearing base 31 with the pivot axis Y as the center (as shown in FIG. 6A). The accommodating space 34 is surrounded and defined by the carrying plate member 33 and the clamping plate member 32.

The bearing base 31 has a disc-shaped plate 311, a first base body 312, a second base body 313, a main penetrating groove 314, two first accommodating grooves 315, two second accommodating grooves 316, and two mounting plates 317. The disc-shaped plate 311 has a circular-disk shape and has four shaft holes 3111 extending parallel to the main axis X, and the shaft holes 3111 are spaced apart from each other.

The first base body 312 and the second base body 313 are formed on the disc-shaped plate 311 at intervals, and taking the gravity direction G as a reference basis, the first base body 312 is located below the second base body 313. The first base body 312 is partially accommodated in the accommodating space 34 and has a stop block 3121, two first slideways 3122, two first abutting portions 3123, and two first screw fixing holes 3124. The stop block 3121 is roughly in a shape of an inverted trapezoid, and is arranged along a direction perpendicular to the first axis X1. The first slideways 3122 extend in an arc shape along the first axis X1 (that is, the first slideways 3122 are arc-shaped slideways), and the first slideways 3122 are located on both sides of the stop block 3121 respectively. The first abutting portions 3123 are respectively a recessed wall, are formed between the stop block 3121 and the first slideways 3122, are provided for a part of the first torsion spring unit 4 to abut, and intercommunicate with the first accommodating grooves 315. The second base body 313 is partially accommodated in the accommodating space 34 and has two second slideways 3131, two second abutting portions 3132 and two second screw fixing holes 3133. The second slideways 3131 extend in an arc shape along the second axis X2 (that is, the second slideways 3131 are arc-shaped slideways) and intercommunicate with each other. The second abutting portions 3132 are also respectively a recessed wall, intercommunicate with the second accommodating grooves 316, and are provided for a part of the second torsion spring unit 5 to abut.

The main penetrating groove 314 is roughly formed on the center of the disc-shaped plate 311 for accommodating the quick-release base 21, is roughly a square groove, is adjacent to the first base body 312 and the second base body 313, and intercommunicates with the shaft holes 3111. The first accommodating grooves 315 are formed on the first base body 312 at intervals, and are located on both sides of the stop block 3121. The second accommodating grooves 316 are formed on the second base body 313 at intervals. The first accommodating grooves 315 are exposed on a front surface of the disc-shaped plate 311. The second accommodating grooves 316 are exposed on a rear surface of the disc-shaped plate 311 and are located above the first accommodating grooves 315 in the gravity direction G. The mounting plates 317 are spaced apart from each other and adjacent to the main penetrating groove 314, are roughly rectangular plates, and have a passing hole 3171, a fixing hole 3172 and two locking fixing holes 3173, respectively. A cross-sectional shape of each of the passing holes 3171 is circular, and each of the passing holes 3171 is provided for each of the main spindle rods 212 to penetrate through. Each of the fixing holes 3172 has a flat-shape cross-section and is provided for each of the fixing blocks 2322 to engage with, whereby the second friction fin sets 232 are able to move simultaneously with the mounting plates 317. The locking fixing holes 3173 are respectively intercommunicated with the shaft holes 3111, and the mounting plates 317 can be fixed to the disc-shaped plate 311 by screws (not shown). In addition, one of the gaskets 214 can be arranged between each of the mounting plates 317 and each of the sealing plates 213.

The clamping plate member 32 has a clamping plate 321 and a washer 322. The clamping plate 321 has four clamping holes 3211, wherein two of the clamping holes 3211 are intercommunicated with the first screw fixing holes 3124, and the other two of the clamping holes 3211 are intercommunicated with the second screw fixing holes 3133, whereby the clamping plate 321 can be fixed to the bearing base 31 with screws (not shown). The washer 322 is a plastic ring piece (such as POM plastic) and is sandwiched between the clamping plate 321 and the carrying plate member 33 to prevent the carrying plate member 33 from being worn when rotating relative to the clamping plate 321, and the washer 322 is arranged on the first slideways 3122 and the second slideways 3131. The carrying plate member 33 has a carrying plate 331 and an annular plate 332. The carrying plate 331 is used for carrying the display 2000 and has two engaging hooks 3311. The annular plate 332 is sandwiched between the carrying plate 331 and the bearing base 31, and has two engaging holes 3321 facing the carrying plate 331 and two positioning blocks 3322 facing the bearing base 31. The engaging hooks 3311 are engaged in the engaging holes 3321. The annular plate 332 is arranged on the disc-shaped plate 311 and is accommodated in the first slideways 3122 and the second slideways 3131. The positioning blocks 3322 are able to slide in the first slideways 3122 and the second slideways 3131, and are limited by the stop block 3121. In addition, the annular plate 332 is also a plastic ring piece (such as POM plastic), which is able to prevent the carrying plate 331 from being worn when rotating relative to the bearing base 31.

The first torsion spring unit 4 has a first spindle rod 41 and two first torsion springs 42. The first spindle rod 41 extends along the first axis X1 and penetrates through the first base body 312 and the first accommodating grooves 315. The first torsion springs 42 are sleeved on the first spindle rod 41 and are accommodated in the first accommodating grooves 315 (that is, on the front surface of the disc-shaped plate 311). One end of each of the first torsion springs 42 abuts against the first abutting portions 3123, and the other end of each of the first torsion springs 42 abuts against the first adjoining portions 2116. The present disclosure takes one first spindle rod 41, two first torsion springs 42 and two first accommodating grooves 315 as an example, and other numbers can be designed according to requirements.

The second torsion spring unit 5 has two second spindle rods 51 and two second torsion springs 52. The second spindle rods 51 extend along the second axis X2 and penetrate through the second base body 313 and the second accommodating grooves 316. The second torsion springs 52 are sleeved on the second spindle rods 51 and are respectively accommodated in the second accommodating grooves 316 (that is, located on the rear surface of the disc-shaped plate 311). One end of each of the second torsion springs 52 abuts against the second abutting portions 3132, and the other end of each of the second torsion springs 52 abuts against the second adjoining portions 2117. The present disclosure takes two second spindle rods 51, two second torsion springs 52, and two second accommodating grooves 316 as an example. Other numbers can be designed according to requirements, for example, one second spindle rod 51 is matched with two second torsion springs 52, but it is not limited to this. In the present disclosure, only one of the first torsion spring unit 4 and the second torsion spring unit 5 may be provided.

Please refer to FIG. 6A again, a first elastic force and a second elastic force are smallest when the bearing base 31 is in the first position. When an external force F is applied, the display 2000 and the carrying unit 3 are able to start to rotate from the first position to the second position relative to the quick-release base 21 with the main axis X as an axis. At this time, the first elastic force of the first torsion springs 42 and the second elastic force of the second torsion springs 52 will gradually increase, and cause the first friction fin sets 231 and the second friction fin sets 232 to generate relative rotation and friction. As shown in FIG. 6B, the first elastic force and the second elastic force are largest when the bearing base 31 is in the second position. Thereby, when the external force F is removed, the display 2000 and the carrying unit 3 can be stopped at an arbitrary position between the first position and the second position, and the inclination angle of the display 2000 can be changed at the same time. The above implementation of the second position according to the present disclosure is described with the carrying unit 3 being perpendicular to the protruding neck 13 (the pivot axis Y and the third axis X3 sandwich an angle θ), but it is not limited to this. The second position referred to in the present disclosure can also be an embodiment where the carrying unit 3 is rotated to an upper end of which is farther away from the column 12 than a lower end (that is, the angle θ is larger).

As mentioned above, in addition to adjusting the inclination angle of the display 2000, the present disclosure can also change the display 2000 in a portrait state or a landscape state. In specific, when the positioning blocks 3322 are located on the main axis X, the display 2000 is in the landscape state. When the carrying plate member 33 rotates relative to the bearing base 31 about the pivot axis Y, the positioning blocks 3322 slide in the first slideways 3122 and the second slideways 3131, wherein when one of the positioning blocks 3322 is stopped by the stop block 3121, the display 2000 is in the portrait state.

In summary, the display supporting device according to the present disclosure deviates the torsion spring unit from the axis of rotation of the carrying unit relative to the quick-release base, such that the torsion spring unit is free from being sleeved on the main spindle rods of the carrying unit that rotate relative to the quick-release base, so the overall thickness of the carrying unit can be effectively reduced. In addition, since the torsion spring unit is free from being sleeved on the main spindle rods, the size of the main spindle rods or the limited space in the carrying unit does not limit the number of torsion spring units, which can effectively meet the torsion requirement of a large-sized display.

What is claimed is:

1. A display supporting device for carrying a display on a work surface, the display supporting device comprising:
   a supporting upright disposed on the work surface and including a protruding neck;
   a quick-release unit having a quick-release base and a fixing member, wherein the quick-release base is detachably arranged on the protruding neck by the fixing member;
   a carrying unit provided for the display and having a bearing base, wherein the bearing base is connected to the quick-release base, and is able to pivotally change between a first position and a second position relative to the quick-release base with a main axis as a center; and
   a first torsion spring unit constantly providing a first elastic force and having a first spindle rod and at least one first torsion spring, wherein the first spindle rod extends along a first axis being substantially parallel to the main axis, and wherein the at least one first torsion spring is sleeved on the first spindle rod and abuts against the bearing base and the quick-release base respectively,
   wherein when an external force is applied, the display and the carrying unit are able to rotate relative to the quick-release base between the first position and the second position, and wherein when the external force is removed, the display and the carrying unit are able to be stopped at an arbitrary position between the first position and the second position relative to the quick-release base.

2. The display supporting device of claim 1, wherein the bearing base has a main penetrating groove and at least one first accommodating groove, and wherein the quick-release base is accommodated in the main penetrating groove, and the at least one first torsion spring is correspondingly accommodated in the at least one first accommodating groove.

3. The display supporting device of claim 2, wherein the first elastic force is smallest when the bearing base is in the first position, and wherein the first elastic force is largest when the bearing base is in the second position.

4. The display supporting device of claim 3, further comprising a second torsion spring unit constantly providing a second elastic force and having a second spindle rod and at least one second torsion spring, wherein the second spindle rod extends along a second axis being substantially parallel to the main axis, and wherein the at least one second torsion spring is sleeved on the second spindle rod and abuts against the bearing base and the quick-release base respectively.

5. The display supporting device of claim 4, wherein the bearing base further has at least one second accommodating groove, and wherein the at least one second torsion spring is correspondingly accommodated in the at least one second accommodating groove.

6. The display supporting device of claim 5, wherein the second elastic force is smallest when the bearing base is in the first position, and wherein the second elastic force is largest when the bearing base is in the second position.

7. The display supporting device of claim 6, wherein the bearing base has a disc-shaped plate, a first base body and a second base body, wherein the main penetrating groove is formed on a center of the disc-shaped plate, and the first base body and the second base body are formed at intervals on the disc-shaped plate and respectively adjacent to the main penetrating groove, and wherein the at least one first accommodating groove is formed on the first base body, and the at least one second accommodating groove is formed on the second base body.

8. The display supporting device of claim 7, wherein the at least one first torsion spring and the at least one second torsion spring are in quantity of two respectively, and the at least one first accommodating groove and the at least one second accommodating groove are in quantity of two respectively.

9. The display supporting device of claim 8, wherein the first base body further has a stop block, two first slideways and two first abutting portions, wherein the first slideways extend in an arc shape along the first axis, and the first slideways are located on two sides of the stop block respectively, and wherein each of the first abutting portions is respectively formed between the stop block and the first slideways, intercommunicates with the first accommodating grooves, and allows one end of each of the first torsion springs to abut.

10. The display supporting device of claim 9, wherein the second base body further has two second slideways and two second abutting portions, and wherein the second slideways extend in an arc shape along the second axis, and each of the second abutting portions allows one end of each of the second torsion springs to abut.

11. The display supporting device of claim 2, wherein the quick-release base has a body and two main spindle rods extending from two sides of the body, wherein the bearing base further has two mounting plates spaced apart from each other and adjacent to the main penetrating groove, and wherein the main spindle rods respectively and correspondingly penetrate through the mounting plates.

12. The display supporting device of claim 11, wherein the two sides of the body respectively have a recess, the quick-release base further has two sealing plates, and wherein each of the sealing plates covers each of the recesses, and each of the main spindle rods correspondingly penetrates through each of the sealing plates and is partially and correspondingly accommodated in each of the recesses.

13. The display supporting device of claim 12, wherein the quick-release unit further has two friction members, and the friction members are respectively and correspondingly sleeved on the main spindle rods.

14. The display supporting device of claim 13, wherein the carrying unit further has a clamping plate member and a carrying plate member, and wherein the carrying plate member is sandwiched between the clamping plate member and the bearing base, and is able to pivot relative to the bearing base with a pivot axis as a center.

15. The display supporting device of claim 14, wherein each of the sealing plates has a penetrating hole, and each of the mounting plates has a passing hole, and wherein each of the main spindle rods correspondingly penetrates through the penetrating holes and the passing holes respectively, and a cross-sectional shape of each of the main spindle rods matches with a cross-sectional shape of each of the penetrating holes and is non-circular, and a cross-sectional shape of each of the passing holes is circular.

16. The display supporting device of claim 15, wherein the carrying plate member has a carrying plate and an annular plate, and the clamping plate member has a clamping plate and a washer, wherein the carrying plate is used for carrying the display, wherein the annular plate engages with the carrying plate, is sandwiched between the carrying plate and the bearing base, and has two positioning blocks, and wherein the positioning blocks are able to slide in the first slideways and the second slideways and are stopped by the stop block, the clamping plate is fixed to the bearing base, and the washer is sandwiched between the clamping plate and the carrying plate.

17. The display supporting device of claim 16, wherein each of the friction members has a first friction fin set and a second friction fin set, wherein each of the first friction fin sets has a plurality of first friction fins and a through hole, wherein each of the through holes penetrates through the first friction fins and is provided for each of the main spindle rods to penetrate through, wherein each of the second friction fin sets has a plurality of second friction fins and a circular hole, wherein each of the circular holes penetrates through the second friction fins and is provided for each of the main spindle rods to penetrate through, and wherein the first friction fins and the second friction fins are alternately stacked with each other, and a cross-sectional shape of each of the through holes matches with the cross-sectional shape of each of the main spindle rods and is non-circular.

18. The display supporting device of claim 17, wherein each of the second friction fin sets further has a fixing block, each of the mounting plates further has a fixing hole, and the fixing block is formed on one of the second friction fins closest to the mounting plates and engages with the fixing hole, and wherein when the carrying unit rotates relative to the quick-release base, each of the second friction fin sets is able to generate relative rotation and friction with each of the first friction fin sets.

19. The display supporting device of claim 18, wherein the protruding neck has an adjoining surface, the body has an abutting surface, and the adjoining surface and the abutting surface are matched and are respectively a concave arc surface and a convex arc surface, and wherein when the quick-release base is disposed on the protruding neck, the adjoining surface is attached to the abutting surface.

* * * * *